(12) United States Patent
Roper

(10) Patent No.: US 11,747,968 B1
(45) Date of Patent: Sep. 5, 2023

(54) SYSTEM AND METHOD FOR THUMBTACKING INFORMATION AND LOCATIONS AT A CENTRALIZED REPOSITORY IN AN ELECTRONIC DEVICE

(71) Applicant: Angela Roper, Allentown, PA (US)

(72) Inventor: Angela Roper, Allentown, PA (US)

( * ) Notice: Subject to any disclaimer, the term of this patent is extended or adjusted under 35 U.S.C. 154(b) by 0 days.

(21) Appl. No.: 17/884,865

(22) Filed: Aug. 10, 2022

Related U.S. Application Data

(60) Provisional application No. 63/318,846, filed on Mar. 11, 2022.

(51) Int. Cl.
*G06F 3/0484* (2022.01)
*G06F 3/04817* (2022.01)
*G06F 16/29* (2019.01)
*H04L 67/146* (2022.01)
*G06Q 30/0207* (2023.01)

(52) U.S. Cl.
CPC ........ *G06F 3/0484* (2013.01); *G06F 3/04817* (2013.01); *G06F 16/29* (2019.01); *H04L 67/146* (2013.01); *G06Q 30/0239* (2013.01)

(58) Field of Classification Search
CPC .................................................. G06F 3/0484
See application file for complete search history.

(56) References Cited

U.S. PATENT DOCUMENTS

| | | | |
|---|---|---|---|
| 2011/0161875 A1* | 6/2011 | Kankainen | G06F 3/0481 715/810 |
| 2014/0053099 A1* | 2/2014 | Groten | G01C 21/3644 715/790 |

* cited by examiner

*Primary Examiner* — Roland J Casillas
(74) *Attorney, Agent, or Firm* — Brennan, Manna & Diamond, LLC

(57) ABSTRACT

The present invention relates to a system, method, and computer-implemented thumbtack application for enabling users to save any type of digital information on their smartphone in a centralized location. The thumbtack application is configured to work in conjunction with other applications installed in a smartphone in which the thumbtack application is installed. In one embodiment, the functionality of the thumbtack application is provided by a plugin for work in conjunction with websites. A thumbtack icon is displayed in other applications and websites enabling a user to thumbtack any information. The thumbtacked information is displayed in the thumbtack application and can be associated with location information which is displayed on a map. The thumbtack information can be shared with third-party providers for providing customized recommendations, discounts, and more.

15 Claims, 10 Drawing Sheets

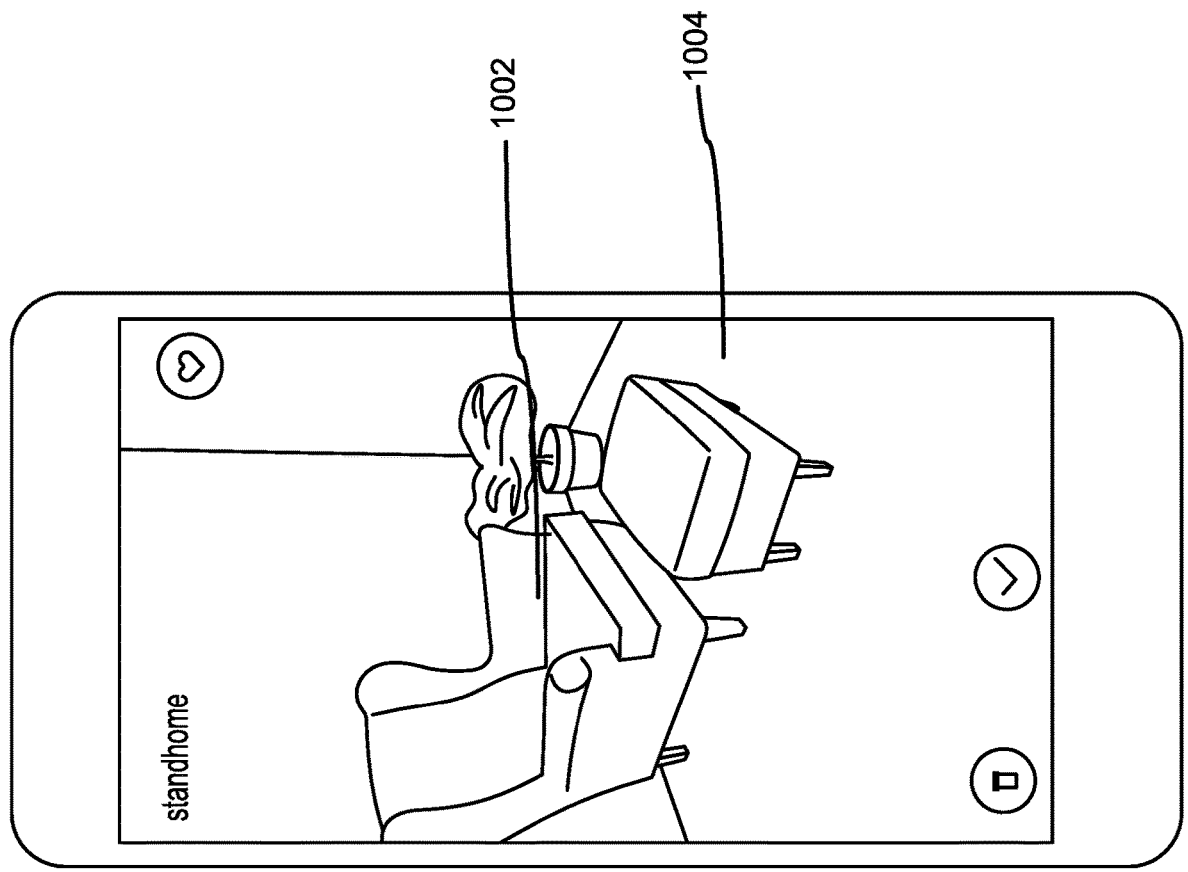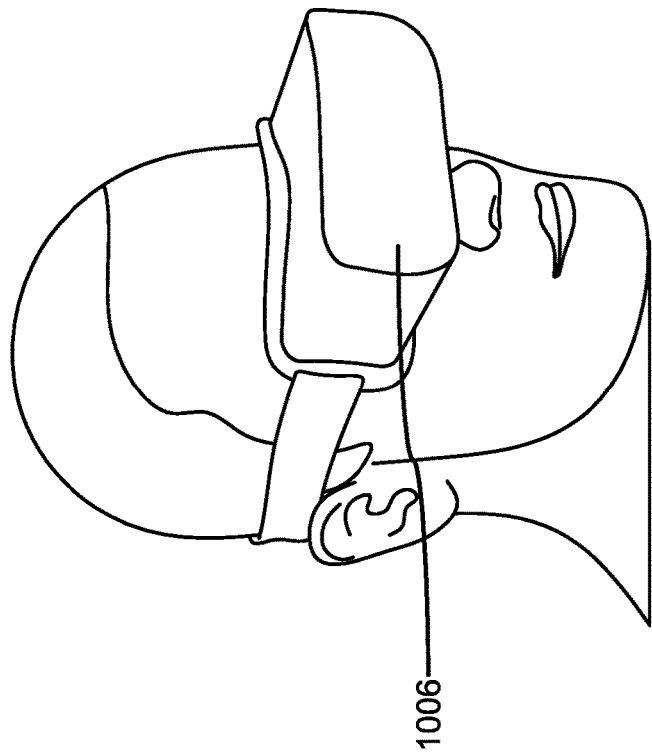
FIG. 10

SYSTEM AND METHOD FOR THUMBTACKING INFORMATION AND LOCATIONS AT A CENTRALIZED REPOSITORY IN AN ELECTRONIC DEVICE

CROSS-REFERENCE TO RELATED APPLICATION

The present application claims priority to, and the benefit of, U.S. Provisional Application No. 63/318,846, which was filed on Mar. 11, 2022 and is incorporated herein by reference in its entirety.

FIELD OF THE INVENTION

The present invention relates generally to the accessing digital information. More specifically, the present invention relates to a thumbtack software application configured to be used in conjunction with other applications to allow users to pin data and information to a centralized area on a phone. A thumbtack icon is displayed in other applications that allows users to pin data and locations. The pinned data is accessible in the thumbtack application enabling users to easily access the data without searching for it across applications. Accordingly, the present disclosure makes specific reference thereto. Nonetheless, it is to be appreciated that aspects of the present invention are also equally applicable to other like applications, devices, and methods of manufacture.

BACKGROUND

By way of background, mobile phones have become ubiquitous. Mobile phones especially smartphones have revolutionized the way individuals communicate with each other locally and globally. Individuals do not only use smartphones for communication, but also for using social media applications, entertainment, banking, hobbies, and many more. Studies have shown that average number of apps installed on users' smartphones is thirty-five. Generally, individuals scroll data and information in various applications and save the content that they like and want to re-visit. Many individuals take screenshot of such information, however, re-visiting such information is difficult as a user has to manually type the URL or keywords or search for the information.

Many applications provide feature of saving information wherein the information is saved in the application itself. Many individuals write such information in physical or digital notebook and many just keep same in their mind. However, all the conventional methods of saving and pinning information are inefficient and difficult to implement. Often, individuals forget the application in which an item or information was saved or pinned due to large number of apps and large number of information saved by users. Further, visiting each application to access saved items is not only time consuming but is also frustrating. Individuals desire an effective way of storing information that is convenient so that the information can be easily accessed at a later stage.

Generally, individuals desire to obtain a location of a certain place or item liked by them. For example, if a user accesses a restaurant marketplace, then a user desires to obtain a location and other information of a preferred restaurant at a later stage without requiring the user to search. Further, individuals desire to be notified when they are around a preferred location enabling them to visit the location.

Therefore, there exists a long felt need in the art for a system and method that allow users to save desired information from a plurality of computer-implemented applications in a single location in a smartphone. There is also a long felt need in the art for a system and method that allows individuals to save any type of digital data in a single location in a smartphone. Additionally, there is a long felt need in the art for a system and method that correlates location with a saved item or place. Moreover, there is a long felt need in the art for a software application that stores items and other information pinned or thumbtacked by a user. Further, there is a long felt need in the art for software application that correlates items and other information pinned or thumbtacked by a user to a map and are displayed on the map. Furthermore, there is a long felt need in the art for a system that eliminates requirements of users to go back into individual applications to retrieve stored information. Finally, there is a long felt need in the art for a computer-implemented application and associated system that works in conjunction with other applications or websites to pin data and information in a centralized location.

The subject matter disclosed and claimed herein, in one embodiment thereof, comprises a computer-implemented method for thumbtacking information in a plurality of applications for storage in a single thumbtacking application in a smartphone. The method allows users to save any type of information on their smartphone in the thumbtacking application and then access later. The method comprising the steps of providing access of said plurality of applications to said thumbtacking application; displaying a thumbtacking icon on user interfaces of said plurality of applications, wherein displayed information or item is thumbtacked on selecting the thumbtacking icon; storing the thumbtacked information in a list of thumbtacked items in the thumbtacking application, wherein the stored thumbtacked information is accessible without having to search for the application in which the information was thumbtacked and displaying a location information related to the thumbtacked information on a map area in said thumbtacking application.

In this manner, the thumbtacking application and associated method of the present invention accomplish all of the forgoing objectives and provides users with a mobile application used in conjunction with other applications or websites to pin data and information in a centralized location. The application displays pinned information on a map and further provides alerts when a user reaches a geographic area near to a pinned location. The application eliminates the need to go back into individual applications to retrieve information.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a computer-implemented method for thumbtacking information in a plurality of applications for storage in a single thumbtacking application. The method comprising the steps of providing access of said plurality of applications to said thumbtacking application; displaying a thumbtacking icon on user interfaces of said plurality of applications, wherein displayed information or item is thumbtacked upon selecting the thumbtacking icon; storing the thumbtacked information in a list of thumbtacked items in the thumbtacking application, wherein the stored thumbtacked information is accessible without having to search for the application in which the information was thumbtacked and displaying a location information related to the thumbtacked information on a map area in said thumbtacking application.

In yet another embodiment, a computer storage media storing computer-executable instructions is disclosed. The instructions which, when executed by an electronic device, cause the electronic device to receiving user-profile information; receiving thumbtacking of information; storing thumbtacked information in a thumbtacking application; associating a location information with said thumbtacked information; displaying location information on a map area; determining current location of the electronic device; sending a notification if said associated location information is within a predetermined distance from current location of the electronic device wherein the notification includes at least a discount coupon.

In yet another embodiment, the method includes the steps of sharing said user-profile information and said thumbtacking information to third-party providers and receiving revenue from said providers for shared information.

In yet another embodiment, a system for providing thumbtacking of information in a plurality of computer-implemented applications is disclosed. The system includes a computer-implemented application that causes a processor to cause display of a thumbtacking icon on information displayed by said computer-implemented applications; import thumbtacking information into a thumbtacking application; displaying thumbtacking information in the thumbtacking application; displaying a map area with a location of said thumbtacking information; determining a current location of the device in which the processor is installed; determining a distance of said current location and said thumbtacking information location; sending a notification displaying personalized information on determining that said distance is less than a predetermined distance.

Numerous benefits and advantages of this invention will become apparent to those skilled in the art to which it pertains upon reading and understanding of the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which:

FIG. 10 illustrates an exemplary view of the thumbtacked application in an augmented reality for supporting augmented and virtual reality applications in accordance with the disclosed architecture.

DETAILED DESCRIPTION OF THE PRESENT INVENTION

Figure 1:
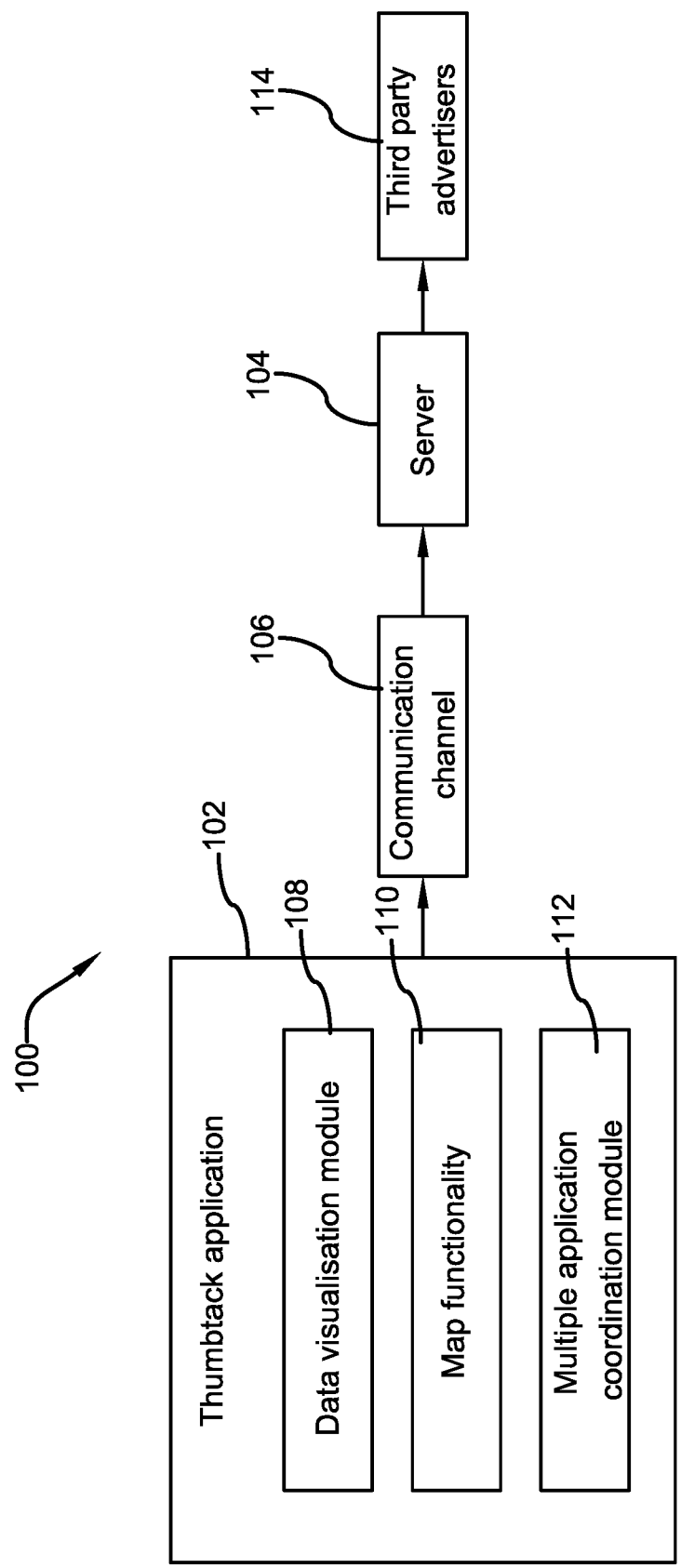
FIG. 1 illustrates a schematic view of a thumbtack application system of the present invention in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long felt need in the art for a system and method that allow users to save desired information from a plurality of computer-implemented applications in a single location in a smartphone. There is also a long felt need in the art for a system and method that allow individuals to save any type of digital data in a single location in a smartphone. Additionally, there is a long felt need in the art for a system and method that correlates location with a saved item or place. Moreover, there is a long felt need in the art for a software application that stores items and other information pinned or thumbtacked by a user. Further, there is a long felt need in the art for software application that correlates items and other information pinned or thumbtacked by a user to a map and are displayed on the map. Furthermore, there is a long felt need in the art for a system that eliminates requirements of users to go back into individual applications to retrieve stored information. Finally, there is a long felt need in the art for a computer-implemented application and associated system that works in conjunction with other applications or websites to pin data and information in a centralized location.

The present invention, in one exemplary embodiment, is a computer storage media storing computer-executable instructions. The instructions which, when executed by an electronic device, cause the electronic device to receive user-profile information; receiving thumbtacking of information; storing thumbtacked information in a thumbtacking application; associating a location information with said thumbtacked information; displaying location information on a map area; determining current location of the electronic device; sending a notification if said associated location information is within a predetermined distance from current location of the electronic device wherein the notification includes at least a discount coupon.

Referring initially to the drawings, FIG. 1 illustrates a schematic view of the thumbtack application system of the present invention in accordance with the disclosed architecture. The thumbtack system 100 of the present invention is designed to allow users to save any type of information on their smartphone and then access later easily without requiring searching in various applications. The system 100 provides a computer-implemented thumbtack application 102 installed in an electronic device or alternatively can be in the form of a plugin that is installed in a browser application. The application/plugin works in conjunction with other applications or websites to pin/thumbtack data and information in the thumbtack application 102 enabling users to easily access the information in the application 102.

The application 102 is configured to be connected to a server 104 that is configured to provide necessary user interfaces for functionality of the application 102. The application 102 and the server 104 are coupled using a communication channel 106. The thumbtack application 102 includes a data visualization module 108 for importing user interfaces from the remote server 104. The data visualization module 108 provides the augmented reality display and lists of the thumbtacked items in the application 102 as illustrated and described later in the disclosure.

A map functionality module 110 is operative to display the thumbtacked information in association with a map in the application 102. The module 110 displays a geographical area along with thumbtacked location information. The map provided by the map functionality module 110 is dynamic and can provide satellite or terrain map display. A multiple application coordination module 112 is configured to provide thumbtack application 102 access of information accessed by a user in other applications and websites. The module 112 allows the application 102 to coordinate and import information from the other applications.

The server 104 can be a cloud server, web server or more and may include databases to store user information and information about thumbtacked items. Further, the server 104 is coupled to a plurality of third-party advertisers and service providers 114 that allows customized discounts, advertisements, and more to be delivered to the customers. More specifically, the server 104 is configured to share the information of registered users of the application 102 along with thumbtack items information with service providers 114 thereby earning revenue and helping service providers providing customized recommendations and information.

The server 104 that can be in the form of a central server, cloud-based server, or distributed server. The server 104 is configured to provide a plurality of graphical user interfaces (GUI) on the application/website accessed by users through their electronic devices. The server system 104 can be realized through various web-based technologies such as, but not limited to, a Java web-framework, a .NET framework, a personal home page (PHP) framework, or any web-application framework.

The application 102 and the modules 108, 110, 112 include computer readable instructions readable by processor of an electronic device in which the application 102 is installed. The electronic device can be a smartphone, laptop, PDA, smartwatch, or any other conventional computing system and is used for interacting with the server 104, thereby enabling users to access functionalities provided by the server 104.

The communication channel 106 such as Internet is used for communication. The communication channel 106 may include a wireless channel, a wired channel, a combination of wireless and wired channel thereof. The wireless or wired channel may be associated with a data standard which may be defined by one of a Local Area Network (LAN), a Personal Area Network (PAN), a Wireless Local Area Network (WLAN), a Wireless Sensor Network (WSN), Wireless Area Network (WAN), Wireless Wide Area Network (WWAN), a metropolitan area network (MAN), a satellite network, the Internet, a fiber optic network, a coaxial cable network, an infrared (IR) network, a radio frequency (RF) network, and a combination thereof. Embodiments of the present invention are intended to include or otherwise cover any type of communication channel, including known, related art, and/or later developed technologies.

Figure 2:
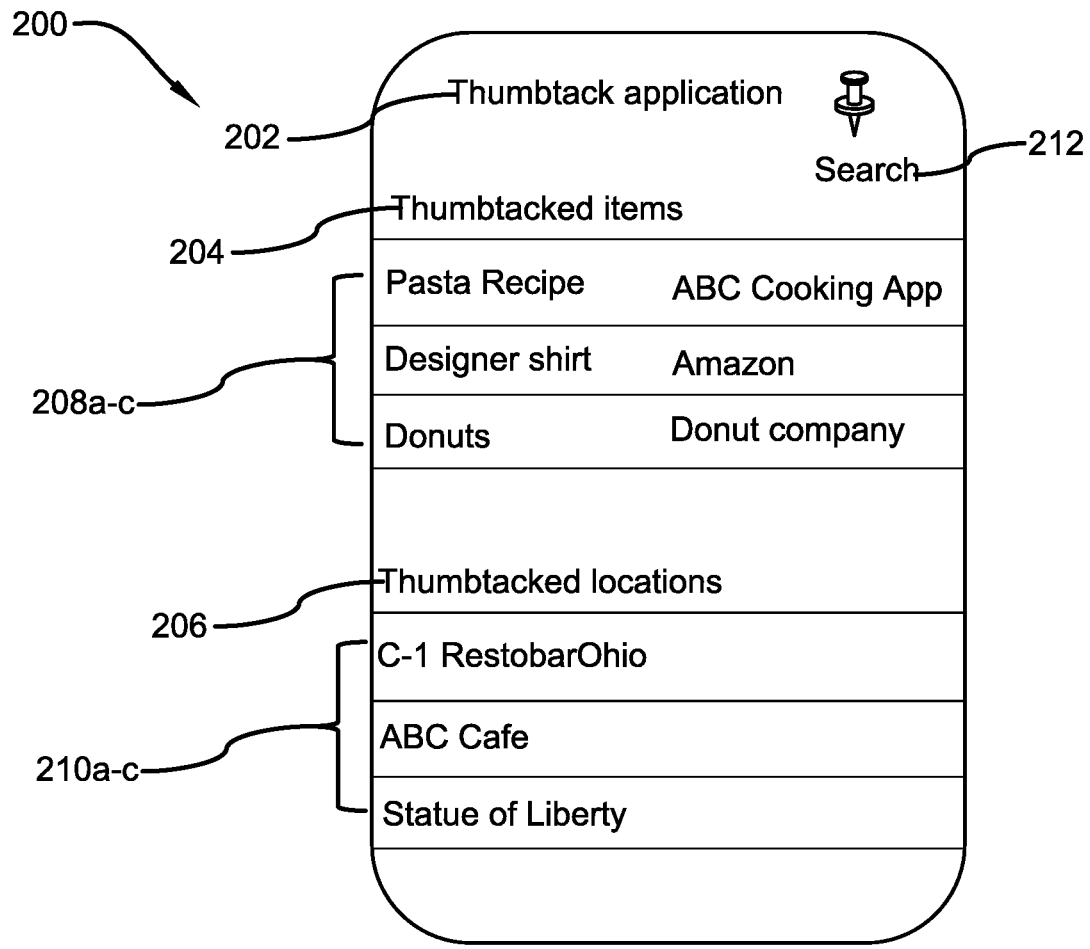
FIG. 2 illustrates an exemplary user interface displayed by the computer-implemented thumbtack application of the present invention in accordance with the disclosed architecture.
Figure 3:
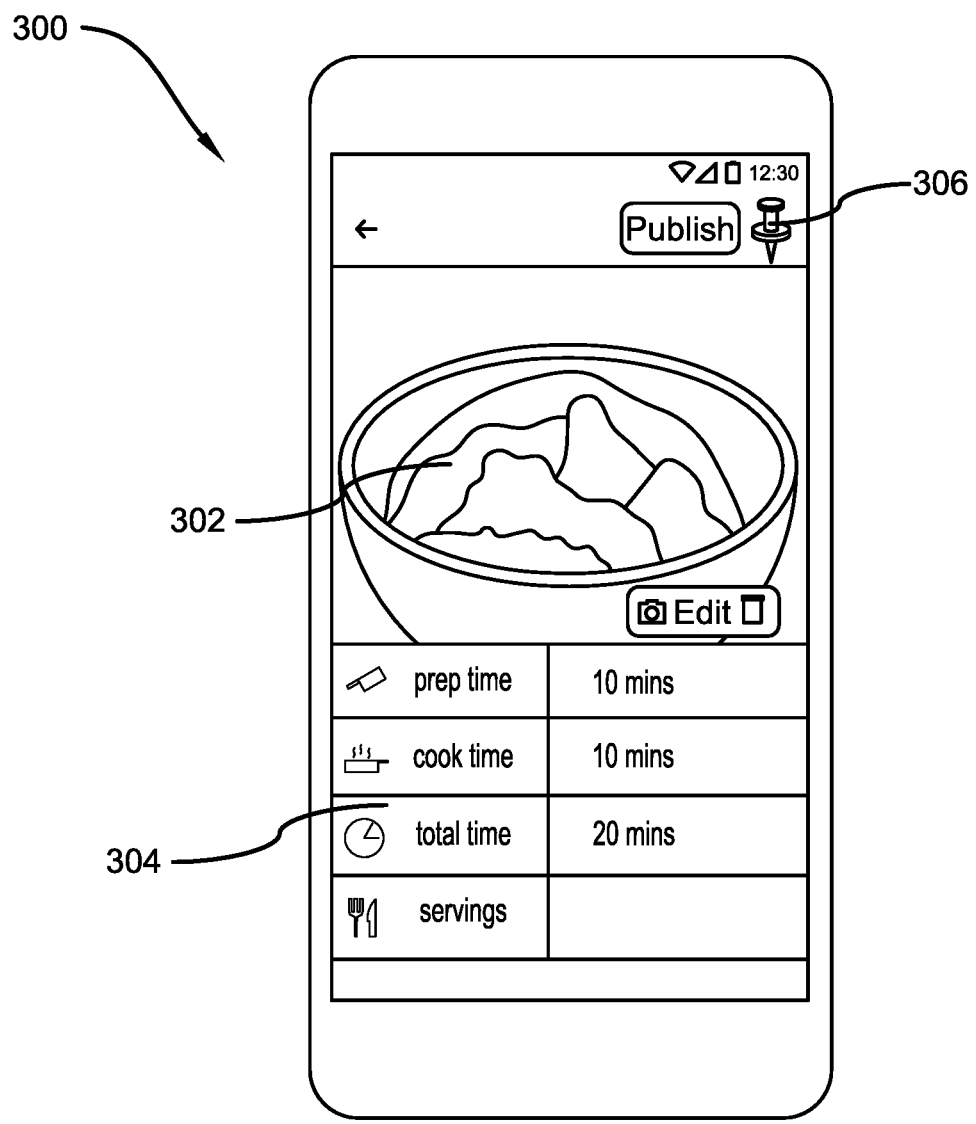
FIG. 3 illustrates a user interface of an exemplary application for thumbtacking a recipe using the thumbtack application in accordance with the disclosed architecture.

FIG. 2 illustrates an exemplary user interface displayed by the computer-implemented thumbtack application of the present invention in accordance with the disclosed architecture. The application 102 is configured to be used in conjunction with other applications or websites enabling users to pin or thumbtack information and data in the other applications such that the thumbtacked data is stored centrally in the thumbtack application 102. The user interface 200 displays a logo 202 of the application 102 on the top and displays a plurality of thumbtacked items 204 and a plurality of thumbtacked locations 206. It should be appreciated that a thumbtack icon is displayed on each of the application or website enabling users to thumbtack information and data as illustrated in FIG. 3.

The thumbtacked items list 204 includes a plurality of thumbtacked items 208a-c wherein each thumbtacked item has a corresponding application/website name enabling a user to easily identify the thumbtacked item. As an example, the thumbtacked item 208a is a pasta recipe that is pinned by a user in ABC cooking application. It should be noted that each thumbtacked item is hyperlinked to the source from which the item is pinned. When a user clicks on a specific thumbtacked item, the user can reach the webpage/application page on which the thumbtacked item is accessible. This eliminates user to leave the application 102 and search for the application to locate the thumbtacked item.

The thumbtacked locations list 206 includes a plurality of thumbtacked locations or location identifiers 210a-c. A user can pin a restaurant, bar, point of interest, hotel, and more enabling thumbtack application 102 to pin the associated location on a map of the application 102. Also, the user can pin a location on a map area displayed in the thumbtack application 102. The thumbtacked locations are used for alerting the user when the user is near that location as a reminder.

A search bar 212 allows users to search for pinned items and locations using keywords. The search bar 212 is configured to support alpha-numerals and supports auto-fill option as well.

FIG. 3 illustrates a perspective view of user interface of an exemplary application for thumbtacking a recipe using the thumbtack application in accordance with the disclosed architecture. In the present embodiment, user interface 300 is of an exemplary application installed in an electronic device in which the thumbtack application is installed. The user interface 300 displays a recipe 302 and associated information 304 which may be liked by a user. A thumbtack icon 306 is displayed on the top of the user interface 300 indicating that access of the exemplary application is provided to the thumbtack application 102.

For thumbtacking the displayed information on the interface 300, a user clicks the thumbtack icon 306 for storing the displayed information in thumbtack application 102. On successful pinning or thumbtacking the information, a push notification and/or a visual message is displayed on display screen of the electronic device. Further, the information is displayed on the user interface of the thumbtack application 102 as described in FIG. 2.

Figure 4:
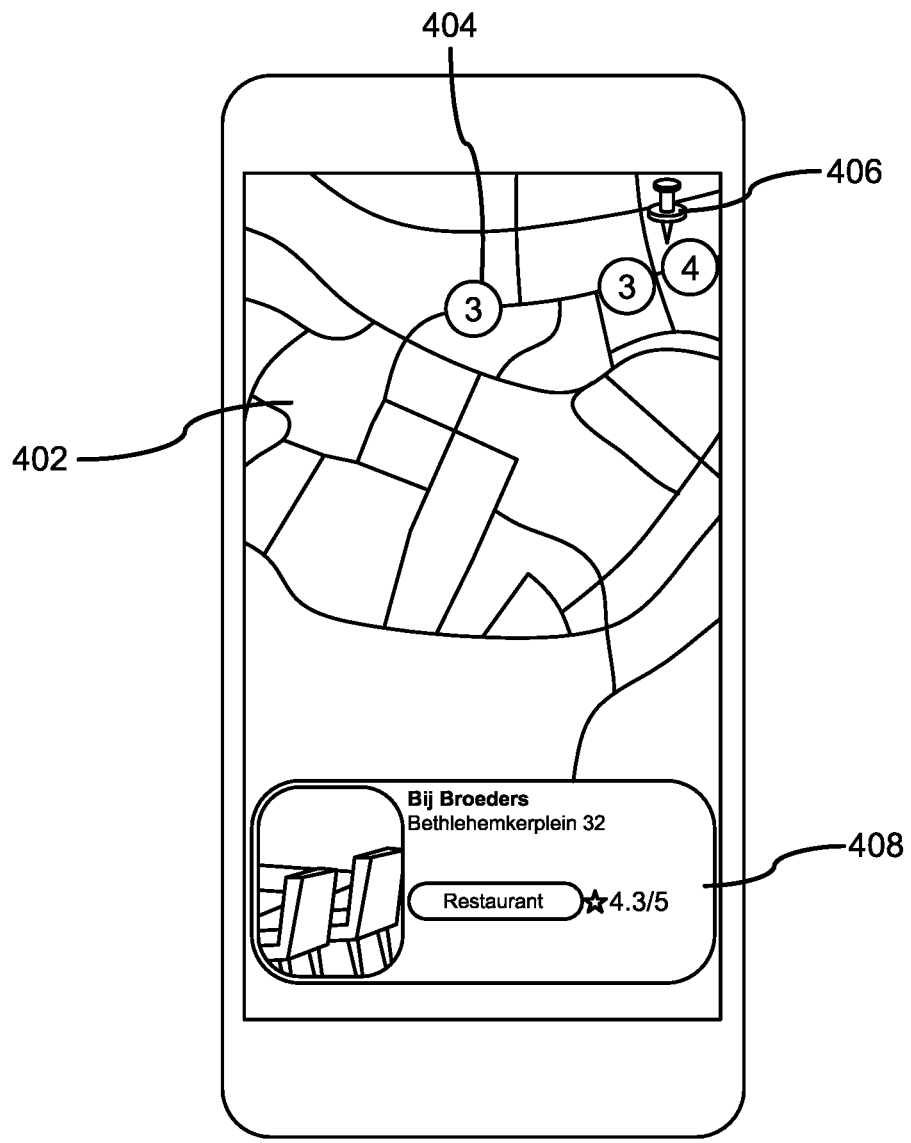
FIG. 4 illustrates a perspective view showing an exemplary user interface of the thumbtack application for thumbtacking a location in accordance with the disclosed architecture.

FIG. 4 illustrates a perspective view showing an exemplary user interface of the thumbtack application 102 for thumbtacking a location in accordance with the disclosed architecture. The thumbtack application 102 is configured to display a map area 402 for displaying nearby points of interest including gas stations, cafes, bars, and more. The map area 402 can be used for selecting and thumbtacking a location 404 using the thumbtacking icon 406.

Once, a location is thumbtacked on the map area 402, the thumbtacked location is added and displayed in the thumbtacked locations list 206 as illustrated in FIG. 2. Also, when a thumbtacked location in opened from the list 206, the map area 402 automatically displays the location and associated information 408.

Figure 5:
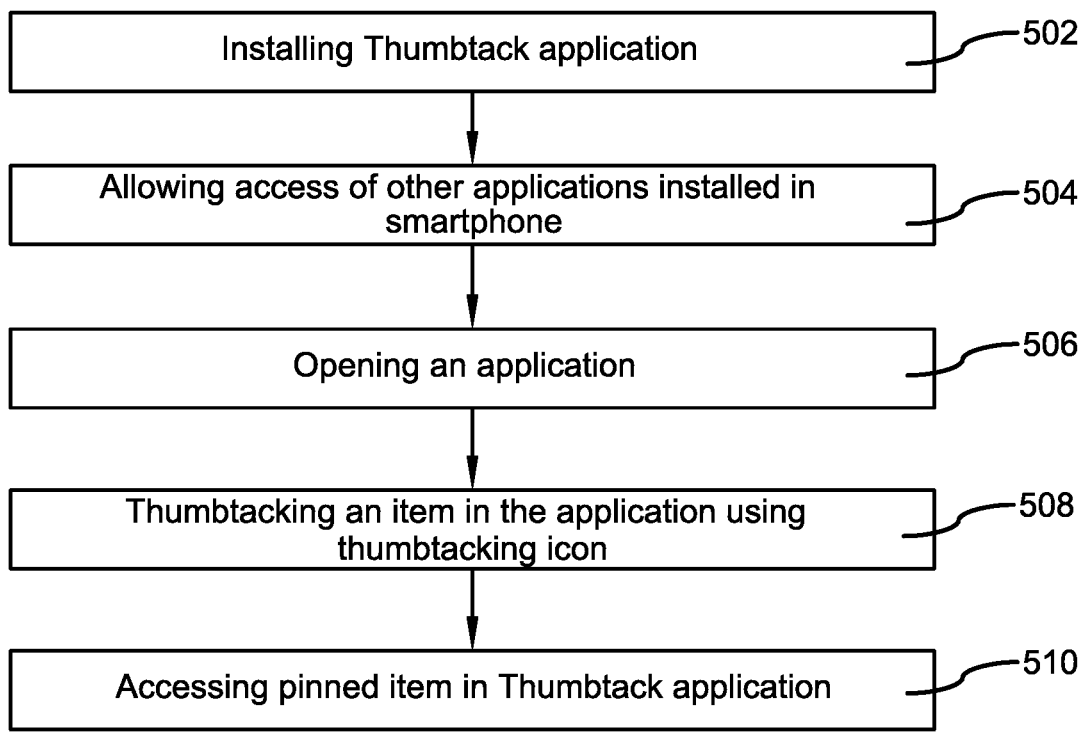
FIG. 5 illustrates a flow diagram depicting an exemplary process of using the thumbtack application of the present invention for thumbtacking items in accordance with the disclosed architecture.

FIG. 5 illustrates a flow diagram depicting an exemplary process of using the thumbtack application of the present invention for thumbtacking items in accordance with the disclosed architecture. Initially, the thumbtack software application is installed in an electronic device (Step 502). The application can be installed from a play store and is visible on the home screen in the form of a thumbtack icon. For working of the thumbtack software application, access of a plurality of other applications installed in the electronic device in which the thumbtack application is installed is provided (Step 504).

For thumbtacking an item or information, any of the applications from the plurality of other applications is opened and information is accessed (Step 506). Then, using the thumbtack icon (as illustrated in FIG. 3), the information is thumbtacked for storage and accessibility in the thumbtack software application (Step 508). Finally, when a user wants to revisit/access the pinned information, then, the pinned/thumbtacked item is accessed in the thumbtack software application without requiring user to search for the information (Step 510).

Figure 6:
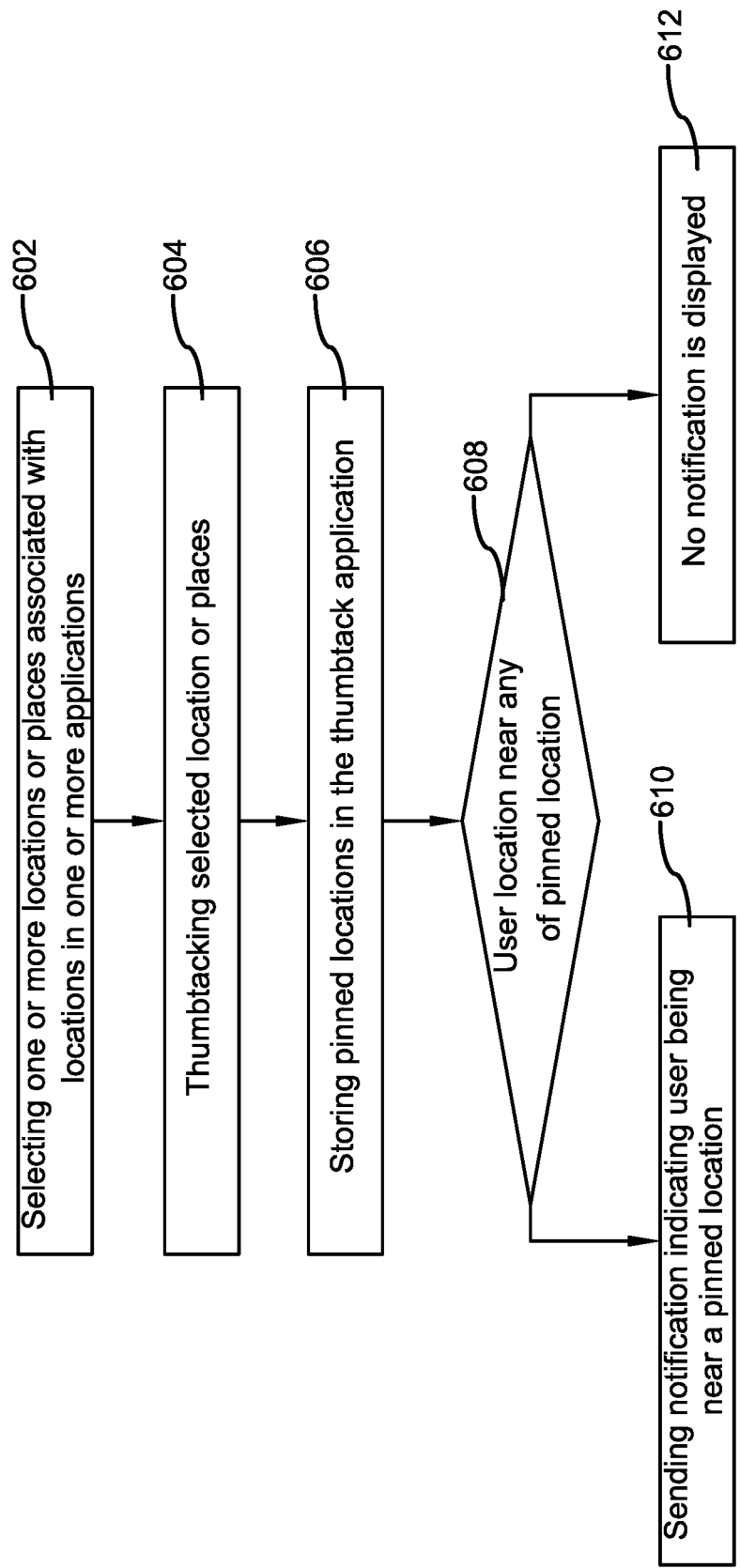
FIG. 6 illustrates a flow diagram depicting a process of thumbtacking a location and sending alerts to a user upon reaching near of the location in accordance with the disclosed architecture.

FIG. 6 illustrates a flow diagram depicting a process of thumbtacking a location and sending alerts to a user upon reaching a proximity of the location in accordance with the disclosed architecture. In the present embodiment, for thumbtacking a location or a place, one or more locations or places are selected in one or more applications or websites other than the thumbtack application (Step 602). Then, the selected locations and places are thumbtacked using thumbtacking icon displayed in corresponding applications (Step 604). Once, the items are thumbtacked, the locations and associated information are stored inside the thumbtack application (Step 606).

The thumbtack application is configured to determine current location of a user using the built-in GPS functionality (Step 608) and in case, the current location is within a predetermined distance from a pinned location, then, a notification is sent by the thumbtack application for alerting a user wherein the notification includes the pinned location, associated information, and distance of the current location from the pinned location (Step 610). In case, the current location is not within the predetermined distance from one or more pinned location, then, no notification is generated (Step 612).

It should be noted that the same workflow takes place when one or more locations or places are pinned by a user on the map area of the thumbtack application of the present invention.

Figure 7:
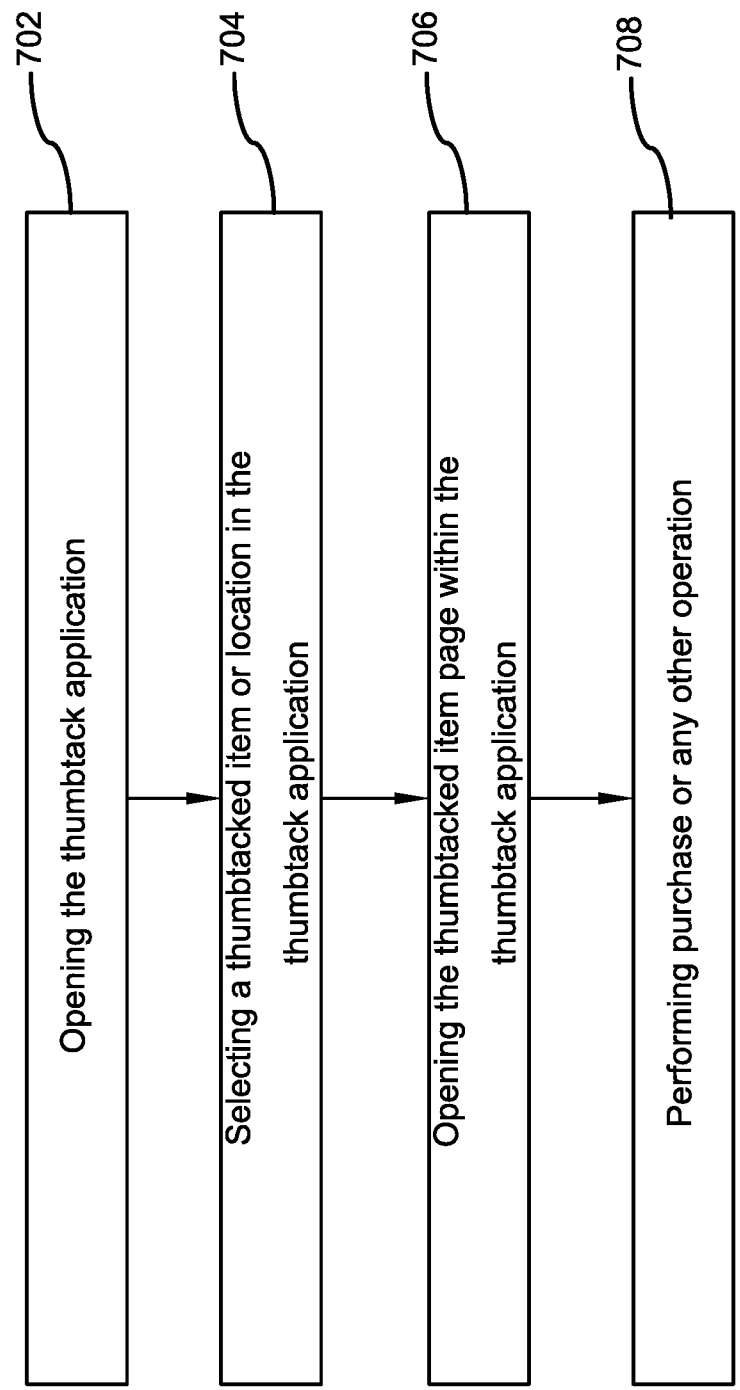
FIG. 7 illustrates a flow diagram depicting a process of accessing a thumbtacked item from the thumbtack application in accordance with the disclosed architecture.

FIG. 7 illustrates a flow diagram depicting a process of accessing a thumbtacked item from the thumbtack application in accordance with the disclosed architecture. As described earlier, the thumbtack application 102 is configured to centrally store the thumbtacked information of various applications and websites and is further configured to store any type of digital data including documents, videos and more. For accessing a thumbtacked item, a user opens the thumbtack application (Step 702). Then, from the list of thumbtacked items and locations, at least one item or location is selected and clicked by a user (Step 704). Upon clicking name of the thumbtacked information, the thumbtacked item page is opened within the thumbtacked application (step 706). It should be appreciated that the thumbtacked item page may be opened in the corresponding application from which the item was thumbtacked. Finally, when the item page is opened, the user can perform any operation on the item including, but not limited to; purchasing, asking for additional information, locating on map, and more (Step 708).

Figure 8:
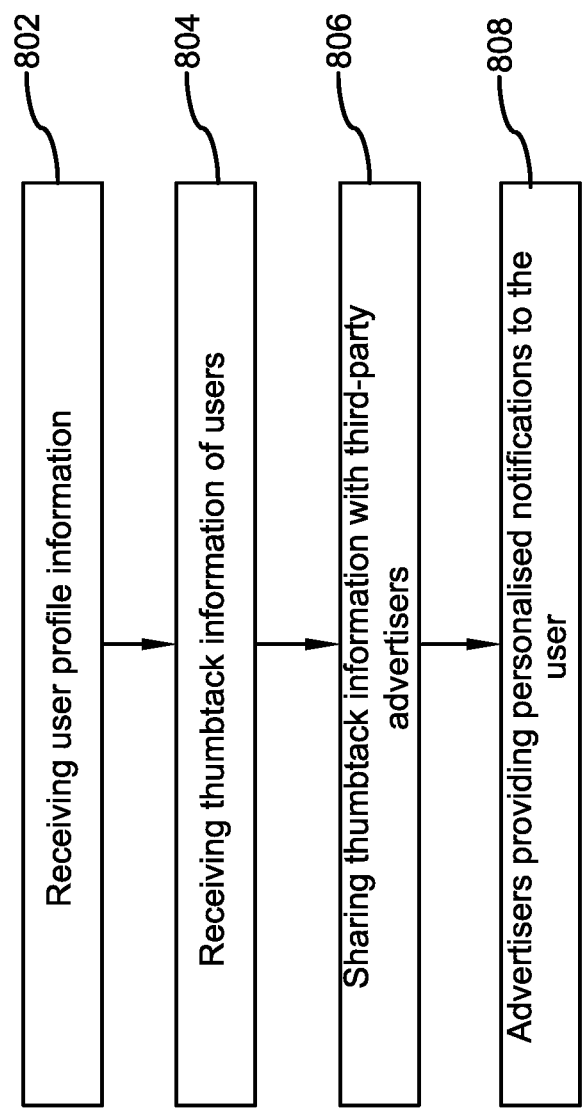
FIG. 8 illustrates a flow diagram depicting a process of sharing user thumbtack data with third-party advertisers for generating revenue in accordance with the disclosed architecture.

FIG. 8 illustrates a flow diagram depicting a process of sharing user thumbtack data with third-party advertisers for generating revenue in accordance with the disclosed architecture. Initially, the application and the system receive profile information of users using the thumbtack application (Step 802). The system is also configured to receive thumbtack information of users (Step 804). The thumbtack information is an indication of preferences, taste and profile of a user and can be used for providing recommendation of similar companies, articles, and more by advertisers for providing personalized recommendations.

The system is configured to share the user and corresponding thumbtack information to third-party advertisers without disclosing confidential information of users of the system (Step 806). The system is configured to receive a fee from the third-party advertisers for accessing the user data of the system. Based on the thumbtack information, personalized recommendations, discounts, and more are recommended to the users by service providers (Step 808). As an example, if a user is near a thumbtacked location, then a discount coupon of retail stores or brands can be provided and displayed to a user enabling the user to use the personalized coupon for shopping at a brand located at the thumbtacked location.

Figure 9:
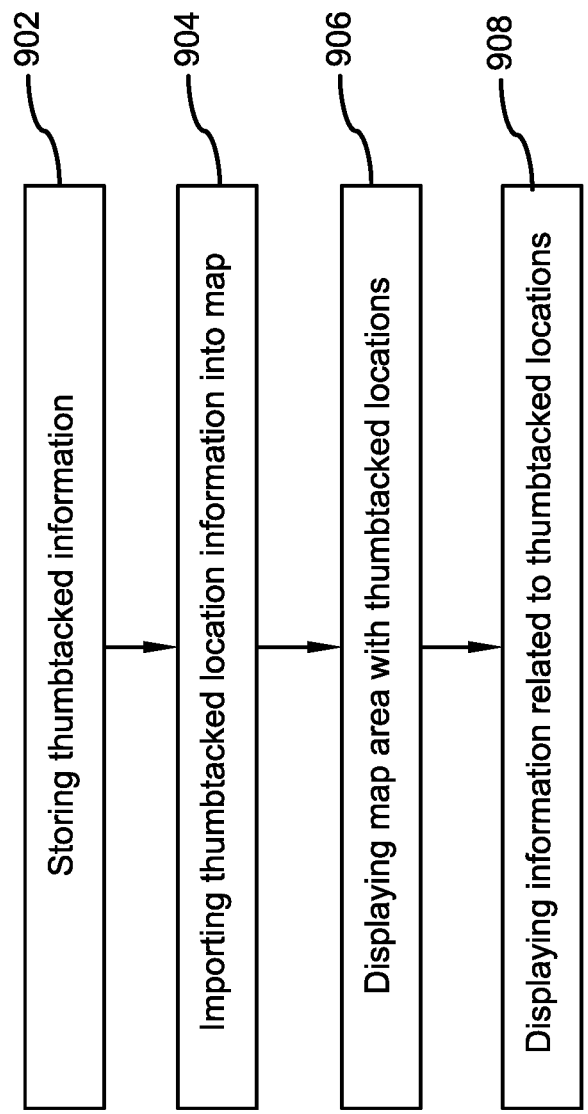
FIG. 9 illustrates a flow diagram depicting a process of displaying places on a map area of the thumbtack application in accordance with the disclosed architecture.

FIG. 9 illustrates a flow diagram depicting a process of displaying places on map area of the thumbtack application in accordance with the disclosed architecture. Initially, the application stores thumbtacked locations and information (Step 902). Then, the application imports thumbtacked location information of the stored items into map area (Step 904). Thereafter, the map area is displayed with the thumbtacked locations appearing on the map area (Step 906). When a thumbtacked location is clicked or selected, then, additional information about the selected location on the map along with any personalized advertisement is displayed (Step 908).

FIG. 10 illustrates an exemplary view of the thumbtacked application 102 in an augmented reality for supporting augmented and virtual reality applications in accordance with the disclosed architecture. The application 102 is also configured to display a thumbtacked item 1002 like a sofa in an augmented reality environment 1004 within the application 102. The thumbtacked items that are sourced from the augmented/virtual reality applications can be displayed in augmented reality environment and further, a user can purchase or perform any other operation in the augmented reality environment 1004.

The application 102 can be paired with a head-mounted display 1006 that is configured to display the virtual/augmented reality display to a user and with respect to the Metaverse.

Certain terms are used throughout the following description and claims to refer to particular features or components. As one skilled in the art will appreciate, different persons may refer to the same feature or component by different names. This document does not intend to distinguish between components or features that differ in name, but not structure or function. As used herein "thumbtack application system", "thumbtack system", and "system" are interchangeable and refer to the thumbtack application system 100 of the present invention. Similarly, as used herein "thumbtack application", and "application" are interchangeable and refer to the thumbtack application 102 of the present invention.

Notwithstanding the forgoing, the thumbtack application system 100 of the present invention can be of any suitable size and configuration as is known in the art without affecting the overall concept of the invention, provided that it accomplishes the above-stated objectives. One of ordinary skill in the art will appreciate that the thumbtack application system 100 as shown in the FIGS. are for illustrative purposes only, and that many other sizes and shapes of the thumbtack application system 100 are well within the scope of the present disclosure. Although the dimensions of the thumbtack application system 100 are important design parameters for user convenience, the thumbtack application system 100 can be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system for providing a computer-implemented thumbtack application comprising:
   an electronic device having a thumbtack application for pinning thumbtack information in said electronic device;
   a server connected to said thumbtack application having a user interface for functioning of said thumbtack application;
   a communication channel for coupling said server to said thumbtack application;
   a map module having a map display for displaying said thumbtack information relative to a geographic area display;
   a data visualization module configured to link and display said pinned thumbtack information that is not relative to a geographic area without leaving the thumbtack application; and
   wherein said thumbtack information having a thumbtack location identifier for pinning an associated said thumbtack location on said map display;
   wherein alerting said electronic device when said electronic device is within a predetermined distance of said thumbtack location; and
   further wherein said server is connected to a plurality of third-party service providers and receives advertisements and discounts from said service providers when said electronic device is determined to be within the predetermined distance of said thumbtack location.

2. The system of claim 1, wherein said map display is a satellite map display.

3. The system of claim 1, wherein said map display is a terrain map display.

4. The system of claim 1, wherein said server is connected to said plurality of third-party service providers for sharing said thumbtack information of a user to said service providers.

5. The system of claim 4, wherein said server is selected from a group consisting of a central server, a cloud-based server, and a distributed server.

6. The system of claim 5, wherein said electronic device is selected from a group consisting of a smartphone, a laptop, a PDA, and a smartwatch.

7. The system of claim 6, wherein said communication channel is selected from a group consisting of a wireless channel, a wired channel, and a combination of wireless and wired channel.

8. The system of claim 4, wherein each said thumbtack information having a website hyperlink.

9. A system for providing a computer-implemented thumbtack application comprising:
   an electronic device having a thumbtack application for pinning thumbtack information in said electronic device;

a server connected to said thumbtack application having a user interface for functioning of said thumbtack application;

a communication channel for coupling said server to said thumbtack application;

a data visualization module configured to link and display said pinned thumbtack information that is not relative to a geographic area without leaving the thumbtack application;

an application module configured to link and display said pinned thumbtack information that is hosted on a third-party web-based application without leaving the thumbtack application; and a map module having a map display for displaying said thumbtack information relative to a geographic area display;

wherein said thumbtack information having a thumbtack location identifier for pinning an associated said thumbtack location on said map display;

wherein said server is connected to a plurality of third-party service providers for receiving advertisements and discounts from said service providers;

wherein said server is connected to said plurality of third-party service providers for sharing said thumbtack information of a user to said service providers;

wherein alerting said electronic device when said electronic device is determined to be within a predetermined distance of said thumbtack location;

wherein said server is connected to a plurality of third-party service providers and receives advertisements and discounts from said service providers when said electronic device is within the predetermined distance of said thumbtack location; and further wherein said alerting including a distance between said thumbtack location and said electronic device.

10. The system of claim 9, wherein said map display is a satellite map display.

11. The system of claim 9, wherein said map display is a terrain map display.

12. The system of claim 9, wherein said electronic device is selected from a group consisting of a smartphone, a laptop, a PDA, and a smartwatch.

13. The system of claim 12, wherein said communication channel is selected from a group consisting of a wireless channel, a wired channel, and a combination of wireless and wired channel.

14. The system of claim 9, wherein each said thumbtack information having a website hyperlink.

15. A system for providing a computer-implemented thumbtack application comprising:

an electronic device having a thumbtack application for pinning thumbtack information in said electronic device;

a server connected to said thumbtack application having a user interface for functioning of said thumbtack application;

a communication channel for coupling said server to said thumbtack application;

a map module having a map display for displaying said thumbtack information relative to a geographic area display;

a data visualization module configured to link and display said pinned thumbtack information that is not relative to a geographic area without leaving the thumbtack application; and an application module configured to link and display said pinned thumbtack information that is hosted on a third-party web-based application without leaving the thumbtack application; and wherein said thumbtack information having a thumbtack location identifier for pinning an associated said thumbtack location on said map display;

wherein said server is connected to a plurality of third-party service providers for receiving a discount coupon from said service providers when said electronic device is within a predetermined distance of said thumbtack location;

wherein said server is connected to said plurality of third-party service providers for sharing said thumbtack information of a user to said service providers;

wherein an alerting of said electronic device when said electronic device is determined to be within a predetermined distance of said thumbtack location;

wherein said server is connected to said plurality of third-party service providers and receives advertisements and the discount coupon from said service providers when said electronic device is determined to be within the predetermined distance of said thumbtack location; and wherein said alerting including a distance between said thumbtack location and said electronic device; and wherein the electronic device is a head-mounted electronic display device.

* * * * *